(12) United States Patent
Sourbes et al.

(10) Patent No.: US 10,071,816 B2
(45) Date of Patent: Sep. 11, 2018

(54) TANK WALL CONNECTOR SYSTEM

(71) Applicant: BOMBARDIER INC., Dorval (CA)

(72) Inventors: Guillaume Sourbes, Ville Mont-Royal (CA); Philippe Désy, Prévost (CA); Jean-Guy Gaudreau, St-Bernadin (CA)

(73) Assignee: BOMBARDIER INC., Dorval, Quebec (CA)

( * ) Notice: Subject to any disclaimer, the term of this patent is extended or adjusted under 35 U.S.C. 154(b) by 435 days.

(21) Appl. No.: 14/769,889

(22) PCT Filed: Mar. 6, 2014

(86) PCT No.: PCT/IB2014/059501
§ 371 (c)(1),
(2) Date: Aug. 24, 2015

(87) PCT Pub. No.: WO2014/136085
PCT Pub. Date: Sep. 12, 2014

(65) Prior Publication Data
US 2017/0001731 A1 Jan. 5, 2017

Related U.S. Application Data

(60) Provisional application No. 61/773,410, filed on Mar. 6, 2013.

(51) Int. Cl.
*B65D 90/46* (2006.01)
*B64D 37/32* (2006.01)
(Continued)

(52) U.S. Cl.
CPC ........... *B64D 37/32* (2013.01); *B64D 37/005* (2013.01); *B64D 37/02* (2013.01)

(58) Field of Classification Search
CPC ....... B64D 37/32; B64D 37/005; B64D 37/02
(Continued)

(56) References Cited

U.S. PATENT DOCUMENTS 3,435,128 A 3/1969 Dorwald
5,410,102 A * 4/1995 Guiol ..................... H01R 4/646
174/142

(Continued)

FOREIGN PATENT DOCUMENTS

CN 101312879 A 11/2008
EP 1479742 A1 11/2004
(Continued)

OTHER PUBLICATIONS

International Search Report and Written Opinion dated Jun. 25, 2014, for International Patent Application No. PCT/IB2014/059501.
(Continued)

*Primary Examiner* — J Gregory Pickett
*Assistant Examiner* — Niki M Eloshway
(74) *Attorney, Agent, or Firm* — Karceski IP Law, PLLC

(57) ABSTRACT

A tank wall connector system for use with a composite tank, the connector comprises a connector having a body extending from an interior of the tank to an exterior of the tank when installed through a hole in the composite tank. The connector has a first electrical conductivity property. An interface is positioned between the connector and a wall of the composite tank when installed to the tank thereby preventing physical contact between the connector and the tank wall in the interior of the tank, the interface having a second electrical conductivity property, different from the first electrical conductivity property.

21 Claims, 2 Drawing Sheets

(51) Int. Cl.
*B64D 37/00* (2006.01)
*B64D 37/02* (2006.01)
*B65D 90/22* (2006.01)

(58) Field of Classification Search
USPC .................................................. 220/562, 601
See application file for complete search history.

(56) References Cited

U.S. PATENT DOCUMENTS

| | | | | |
|---|---|---|---|---|
| 5,676,183 | A * | 10/1997 | Bravo | B67D 7/0478 |
| | | | | 137/375 |
| 7,236,343 | B2 * | 6/2007 | Heidlebaugh | H02G 13/00 |
| | | | | 361/117 |
| 2004/0140667 | A1 * | 7/2004 | Breay | F16L 5/025 |
| | | | | 285/189 |
| 2004/0145122 | A1 * | 7/2004 | Burguete | F16L 5/10 |
| | | | | 277/602 |
| 2006/0099843 | A1 * | 5/2006 | Fullner | F16L 25/02 |
| | | | | 439/275 |
| 2012/0152611 | A1 * | 6/2012 | Fisher | B64D 37/32 |
| | | | | 174/653 |
| 2013/0099067 | A1 * | 4/2013 | Hansom | B64D 37/00 |
| | | | | 248/56 |

FOREIGN PATENT DOCUMENTS

| | | |
|---|---|---|
| FR | 926689 A | 10/1947 |
| GB | 555302 | 8/1943 |
| WO | WO 8901879 | 3/1989 |

OTHER PUBLICATIONS

Chinese Office Action dated Apr. 28, 2016, for Chinese Patent Application No. 201480012335.3.

* cited by examiner

TANK WALL CONNECTOR SYSTEM

CROSS-REFERENCE TO RELATED APPLICATION

This is a National Stage Entry into the United States Patent and Trademark Office from International PCT Patent Application No. PCT/IB2014/059051, having an international filing date of Mar. 6, 2014, which claims the priority of U.S. Provisional Patent Application Ser. No. 61/773,410, filed on Mar. 6, 2013, the entire contents of both of which are incorporated herein by reference.

FIELD OF THE APPLICATION

The present application relates to aircraft fuel tanks and to a tank wall connector system.

BACKGROUND OF THE ART

Composite materials are increasingly used in aircraft, as composite materials are relatively lightweight in comparison to metallic materials currently used, for similar structural integrities.

Compatibility issues arise from the use of composite materials. For instance, tank wall connectors have traditionally been made of metallic materials for use with metallic tanks. In the event that the tank is in a composite material, the use of bonds commonly employed for composite materials may corrode metallic tank wall connectors. On the other hand, the use of metallic tank wall connectors in composite tank walls may result in an electric potential differential in some circumstances, which must be limited in fuel tanks to avoid risk of spark ignition.

SUMMARY OF THE APPLICATION

It is therefore an aim of the present disclosure to provide a tank wall connector system that addresses issues associated with the prior art.

Therefore, in accordance with the present disclosure, there is provided a tank wall connector system for use with a composite tank, the tank wall connector system comprising: a connector having a body extending from an interior of the tank to an exterior of the tank when installed through a hole in the composite tank, the connector having a first electrical conductivity property; and an interface positioned between the connector and a tank wall of the composite tank when installed to the tank thereby preventing physical contact between the connector and the tank wall in the interior of the tank, the interface having a second electrical conductivity property, different from the first electrical conductivity property.

Further in accordance with the present disclosure, the second electrical conductivity property is lower than the first electrical conductivity property.

Still further in accordance with the present disclosure, the body of the connector is metallic.

Still further in accordance with the present disclosure, the interface is made of composite material.

Still further in accordance with the present disclosure, the composite material comprises polyetheretherketone and fibreglass.

Still further in accordance with the present disclosure, the thickness of the interface is at least 1.1 mm.

Still further in accordance with the present disclosure, the interface comprises at least an interface tube portion having an inner diameter sized for the connector to pass therethrough such that an exterior end of the connector is accessible from an exterior of the tank and an interior end of the connector is inside the tank.

Still further in accordance with the present disclosure, the interface tube portion comprises an outer diameter sized to be adapted to be received in the hole of the composite tank wall.

Still further in accordance with the present disclosure, a radial wall projects radially from the interface tube portion and adapted to abut against an interior surface of the tank wall adjacent to said hole.

Still further in accordance with the present disclosure, an anti-rotation feature is connected to or on the radial wall and adapted to be engaged to the tank wall.

Still further in accordance with the present disclosure, an outer tube portion projects axially from the radial wall, the outer tube portion and the radial wall concurrently forming a receptacle for an end of the connector.

Still further in accordance with the present disclosure, the interface is a monolithic piece.

Still further in accordance with the present disclosure, the connector has an abutment on the body, and further comprising at least one fastener operatively engaged to the connector outside of the tank to pull the connector toward the exterior of the tank such that the abutment contacts the interface, whereby the interface is captive between the connector and the tank wall.

Still further in accordance with the present disclosure, the abutment of the connector is a flange.

Still further in accordance with the present disclosure, the body of the connector has threading thereon, and the at least one fastener is threadingly engaged to the threading on the body.

Still further in accordance with the present disclosure, two of said fasteners are threadingly engaged to the threading on the body.

Still further in accordance with the present disclosure, a grounding strip contacts the connector at the exterior of the tank wall and adapted to be connected to a ground.

Still further in accordance with the present disclosure, the grounding strip is adapted to be pressed against the tank wall by the at least one fastener.

Further in accordance with the present disclosure, there is provided a tank wall connector system for use with a composite tank wall, comprising: a connector having a body with an exterior end, an interior end and an abutment between the exterior end and the interior end, with at least the exterior end being adapted to be connected to an electrical wire; an interface comprising at least an interface tube portion having an inner diameter sized for the connector to pass therethrough such that the exterior end of the connector is accessible from an exterior of the tank and the interior end is inside the tank, an outer diameter sized to be adapted to be received in a hole of the composite tank wall, and a radial wall projecting radially from the interface tube portion and adapted to abut against an interior surface of the tank wall adjacent to said hole, whereby electrical insulation is provided between the connector and the interior of the tank by the interface; and at least one fastener operatively engaged to the connector outside of the tank to pull the connector toward the exterior of the tank such that the abutment contacts the interface, whereby the interface is captive between the connector and the tank wall.

Further in accordance with the present disclosure, the body of the connector is metallic.

Still further in accordance with the present disclosure, the interface is made of composite material.

Still further in accordance with the present disclosure, the composite material comprises polyetheretherketone and fibreglass.

Still further in accordance with the present disclosure, the thickness of the interface is at least 1.1 mm.

Still further in accordance with the present disclosure, an anti-rotation feature is connected to or on the radial wall and adapted to be engaged to the tank wall.

Still further in accordance with the present disclosure, an outer tube portion projects axially from the radial wall, the outer tube portion and the radial wall concurrently forming a receptacle for the exterior end of the connector.

Still further in accordance with the present disclosure, the interface is a monolithic piece.

Still further in accordance with the present disclosure, the abutment of the connector is a flange.

Still further in accordance with the present disclosure, the body of the connector has threading thereon, and the at least one fastener is threadingly engaged to the threading on the body.

Still further in accordance with the present disclosure, two of said fasteners are threadingly engaged to the threading on the body.

Still further in accordance with the present disclosure, a grounding strip contacts the connector at the exterior of the tank wall and adapted to be connected to a ground.

Still further in accordance with the present disclosure, the grounding strip is adapted to be pressed against the tank wall by the at least one fastener.

In accordance with another embodiment of the present disclosure, there is provided a method for connecting a connector system to a tank wall of a composite tank comprising: positioning an interface through a hole in the tank wall; positioning a connector in a tube portion of the interface to cause an abutment in an axial direction between the connector and the interface at which electrical insulation is provided between the connector and the interior of the tank by the interface when the interface and the connector are mounted to the tank wall; engaging at least one fastener to an exterior end of the connector to pull the connector and the interface against the tank wall to a captive position; and connecting a wire to at least one end of the connector.

Further in accordance with the present disclosure, positioning the connector in the tube portion is performed prior to positioning the interface through the hole in the tank wall.

Still further in accordance with the present disclosure, positioning the interface through the hole comprises fixing an anti-rotation feature of the interface to the tank wall to block rotation between the interface and the tank wall.

Still further in accordance with the present disclosure, engaging the at least one fastener to the exterior end of the connector comprises threadingly engaging the at least one fastener to threading on the exterior end of the connector.

Still further in accordance with the present disclosure, a grounding strip is attached to the exterior end of the connector.

Still further in accordance with the present disclosure, positioning the interface through a hole in the tank wall comprises pulling the interface until a radial wall at an end of the tube portion of the interface abuts against an interior surface of the tank wall.

BRIEF DESCRIPTION OF DRAWINGS

For a better understanding of the present invention, as well as other aspects and further features thereof, reference is made to the following description which is to be used in conjunction with the accompanying drawings, where.

Figure 1:
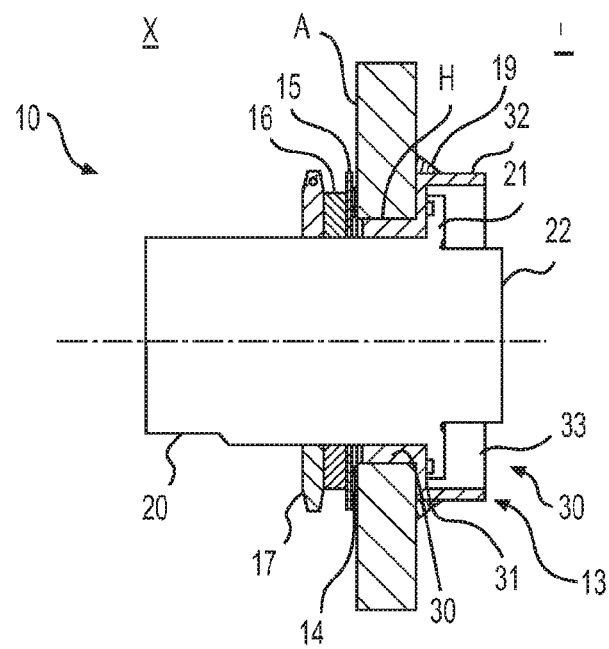
FIG. 1 is a sectional view of a tank wall connector system in accordance with the present disclosure, as mounted to a tank wall.

In the drawings, embodiments of the invention are illustrated by way of example. It is to be expressly understood that the description and drawings are only for purposes of illustration and as an aid to understanding. They are not intended to be a definition of the limits of the invention.

DESCRIPTION OF PREFERRED EMBODIMENTS

Referring to the drawings, and more particularly to FIG. 1, a tank wall connector system in accordance with the present disclosure is generally shown at 10. The tank wall connector system 10 is mounted to a tank wall A, that is part of an aircraft. The tank wall A defines a hole H by which a connector 12 may access an interior of the tank. For illustrative purposes, the interior of the tank wall A is shown as I, whereas the exterior of the tank wall A is shown as X. The tank may be made of a composite material, or other materials as well, for instance with appropriate coatings to isolate the composite material from the fuel in the tank. Moreover, the tank wall A may be a part of a wing spar.

The tank wall connector system 10 has a connector 12 and an interface 13.

The connector 12 is connected at its exterior end to an electrical wire, and has its interior end within the tank. Hence, the connector 12 penetrates into the tank A through the hole H. For instance, the connector 12 is wired to a component inside the tank, such as a meter of any suitable type. The connector 12 is generically illustrated in the sectional views without details for simplicity. However, the connector 12 is more detailed than the generic block shown in the figures.

The interface 13 is the interface between the connector 12 and the tank wall A, and insulates the connector 12 from the tank wall A. Hence, the connector 12 and the interface 13 have different electrical conductivity properties, with the conductivity of the interface 13 being lower.

Figure 3:
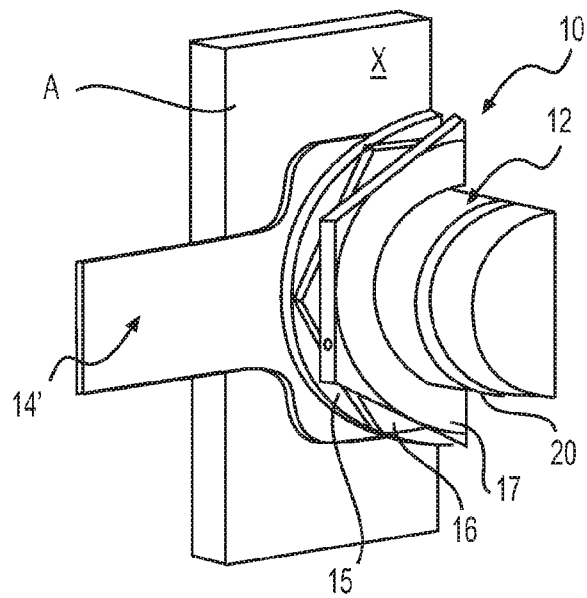
FIG. 3 is a perspective view of the tank wall connector system of FIG. 1, viewed from an exterior of the tank.

Other components of the tank wall connector system 10 may include an attachment plate 14, a washer 15, a first jam nut 16, and a second jam nut 17, arranged sequentially away from the tank wall A and on the exterior X of the tank wall A. Seals 18 and 19 may be provided at various locations within the interior I of the tank wall A, and are made of appropriate materials in light of exposure to fuel and aircraft related temperatures—for instance the seal 18 is a Viton™ seal. As shown in FIG. 3, the attachment plate 14 may comprise a grounding strip 14' by which the grounding attachment plate 14 is grounded to a metallic mass of the aircraft.

Figure 2:
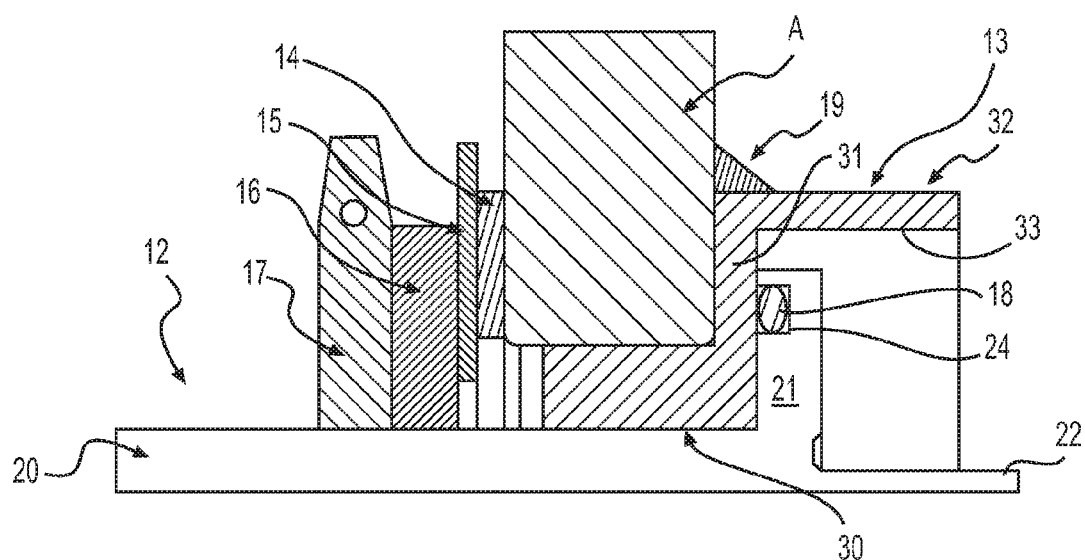
FIG. 2 is an enlarged view of a portion of the tank wall connector system of FIG. 1.

Referring concurrently to FIGS. 1 and 2, the connector 12 is shown having a generally straight cylindrical body, with an exterior portion 20 projecting at the exterior X of the tank wall A. Although a generally straight cylindrical body is shown, other body geometries are considered, such as a tee, an elbow, or the like. The body of the connector 12 is typically made of a metal, such as stainless steel, with an appropriate connector plug body (with circuitry, wiring, or the like). The free end of the exterior portion 20 is adapted to be connected to an electrical wire, by any appropriate connector configuration. A flange 21 is at an interior end of the connector 12, and an interior portion 22 is on an interior end of the flange 21. The flange 21 is one configuration of abutment that may be used to hold the connector 12 captive in the interface 13, as described below. Other abutments may be used, such as an enlargement, a shoulder, a channel, etc.

The interior portion 22 is shown as having a smaller outer diameter than the exterior portion 20, although other diameter ratios are possible. The free end of the interior portion 22 has an electrical connector of any appropriate kind, to be connected to a component within the tank. Alternatively, the connector 12 may be a sensing component itself, such as a gauge, an optical sensor, etc. The exterior portion 20 and interior portion 22 are provided with threading on their respective outer surfaces, for screwing engagement with various other components of the tank wall connector system 10, as described hereinafter.

Still referring to FIGS. 1 and 2, an annular channel 24 is defined in the flange 21, and is sized to receive the seal 18 (e.g., an O-ring), to provide sealing between the connector 12 and the interface 13. Alternatively, such annular channel may be defined in the interface 13, or concurrently in the connector 12 and the interface 13.

Referring to FIGS. 1 and 2, the interface 13 is illustrated as interfacing the connector 12 to the tank wall A. The interface 13 is made of any appropriate material that performs electrical insulation. For instance, a combination of PEEK (polyetheretherketone) and fibreglass is well suited to be used for the interface 13. Moreover, the interface 13, for instance in a PEEK embodiment or in other constructions, may be a monolithic piece. In the PEEK embodiment, the wall thickness of the interface 13 is at least 1.1 mm to provide the desired level of electrical insulation, although other thicknesses are possible as well. The interface 13 comprises an interface tube portion 30. An inner diameter of the interface tube portion 30 is sized to receive therein the exterior portion 20 of the connector 12. According to an embodiment, there is slight play between the exterior portion 20 and the interface tube portion 30 to allow mating connection therebetween and axial floating.

A radial wall 31 projects radially from the interface tube portion 30. The radial wall 31 is located in the interior I of the tank. The radial wall 31 has a generally planar surface that contacts the inner surface of the tank wall A. An outer tubular portion 32 is formed at an end of the radial wall 31 and extends in a direction opposite to that of the interface tube portion 30. The outer tube portion 32 defines concurrently with the radial wall 31 a receptacle 33 sized for receiving therein any connector end of a component connected to the connector 12. In an embodiment, the interface 13 is an integral component (molded in a single piece), and is wet installed to the tank wall A, with appropriate lubricants, sealing compounds, or other additive.

Figure 4:
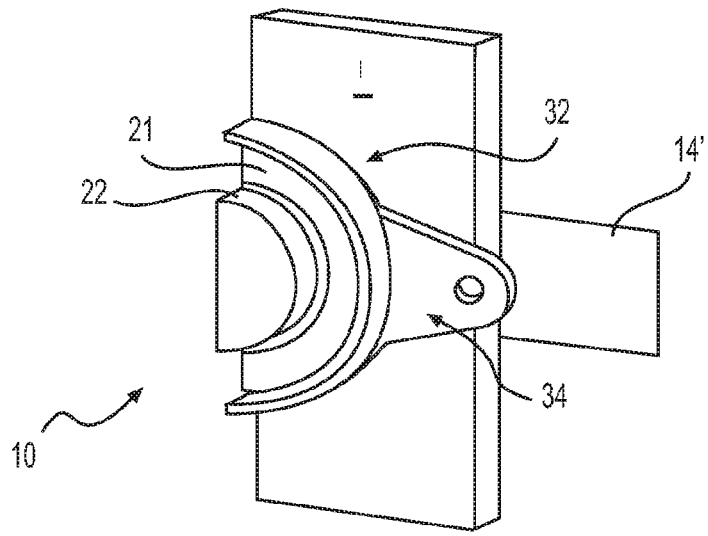
FIG. 4 is a perspective view of the tank wall connector system of FIG. 1, viewed from an interior of the tank.

As shown in FIG. 4, the interface 13 may define an anti-rotation tab 34. The anti-rotation feature such as a tab 34 is used with a fastener of any appropriate kind (e.g., Hi Lite screw) fixed to the tank wall A. Hence, the anti-rotation tab 34 prevents a rotation of the interface 13 when the connector 12 is tightened, in the manner described hereinafter. The anti-rotation feature may also be a part of the radial wall 31, for example. The anti-rotation feature allows the use of a manually-applied sealing compound about the periphery of the interface 13, as shown by seal 19 in FIGS. 1 and 2. Alternatively, a seal (e.g., such as a O-ring) may be positioned between the radial wall 31 of the interface 13 and the tank wall A, provided the radial wall 31 maintains a suitable thickness, and provided all necessary precautions are taken to avoid sparks in the event of a potential differential.

In order to assemble the tank wall connector system 10 to the tank wall A, the interface tube portion 30 of the interface 13 is firstly inserted in the hole H of the tank wall A. A fastener may be secured to the wall A through the anti-rotation tab 34, to prevent the interface 13 from rotating. As mentioned above, the installation may be a wet installation with any appropriate material used to preserve the connection of the interface 13 to the tank wall A. The wet installation may include the addition of seal 19 by manually applying a sealing compound.

The exterior portion 20 of the connector 12 is inserted in the interface 13, such that the exterior portion 20 projects to the exterior X of the tank. The connector 12 may be mated to the interface 13 prior to or after the installation of the interface 13 to the tank wall A. In doing so, the abutment of the connector 12, in the illustrated embodiment the flange 21, comes into abutment with the radial wall 31 to block the connector 12 from moving farther toward the exterior.

To secure the connector 12 and interface 13 to the tank wall A, the attachment plate 14 is screwingly engaged to threading on the exterior tube portion 20. The attachment plate 14 is tightened, for the connector 12 to be pulled toward the exterior. As a result, the flange 21 is pulled up against the radial wall 31. The seal 18 is thus held captive between the connector 12 and the interface 13, and is compressed therein to seal off the joint between the connector 12 and the interface 13. Then, the washer 15 is positioned on the exterior portion 20 against the attachment plate 14. The first jam nut 16 is thereafter tightened by screwing engagement on the exterior portion 20 to ensure the assembly is tightly connected to the tank wall A. The second jam nut 17 may then be screwed onto the exterior portion 20 and against the first jam nut 16, to block the first jam nut 16 from rotating. At any point when the attachment plate 14 is tightened to the connector 12, the grounding strip 14' may be grounded to the metallic mass of the aircraft, by being connected thereto by a conductive wire. Either one of the attachment plate 14 and the washer 15 may be provided with an anti-rotation tab to prevent rotation thereof when the first jam nut 16 is installed.

A wire may then be connected to the free end of the exterior portion 20 of the connector 12, while a component may be connected to the free end of the interior portion 22. In an embodiment, the wire is part of a harness and may be covered by a conductive braided sleeve. The conductive braided sleeve is put in contact with any of the components 13, 15, 16 and 17, to ensure electrical contact therebetween, and connection to the ground, for instance for static charge grounding. On the other hand, the parts of the connector 12 in the interior I of the tank are electrically insulated from the tank wall A, by way of the interface 13.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:
1. A tank wall connector system for use with a composite tank, the tank wall connector system comprising:
  a connector having a body extending from an interior of the tank to an exterior of the tank when installed through a hole in the composite tank, the connector having a first electrical conductivity property;

an interface positioned between the connector and a tank wall of the composite tank when installed to the tank thereby preventing physical contact between the connector and the tank wall in the interior of the tank, the interface comprising an interface tube portion sized for the connector to removably pass therethrough and a radial wall projecting radially from the interface tube portion and adapted to abut against an interior surface of the tank wall, the interface having a second electrical conductivity property, different from the first electrical conductivity property; and at least one fastener operatively engaged to the connector outside of the tank to pull the connector toward the exterior of the tank such that an end of the connector abuts the radial wall of the interface, wherein the body of the connector has threading thereon and the at least one fastener is threadingly engaged to the threading on the body.

2. The tank wall connector system according to claim 1, wherein the second electrical conductivity property is lower than the first electrical conductivity property.

3. The tank wall connector system according to claim 1, wherein the body of the connector is metallic.

4. The tank wall connector system according to claim 1, wherein the interface is made of composite material.

5. The tank wall connector system according to claim 1, wherein the interface tube portion comprises an outer diameter sized to be adapted to be received in the hole of the composite tank wall.

6. The tank wall connector system according to claim 1, the radial wall further comprising an anti-rotation feature adapted to be engaged to the tank wall.

7. The tank wall connector system according to claim 1, further comprising an outer tube portion projecting axially from the radial wall, the outer tube portion and the radial wall concurrently forming a receptacle for the end of the connector.

8. The tank wall connector system according to claim 1, wherein the interface is a monolithic piece.

9. The tank wall connector system according to claim 1, wherein the end of the connector comprises a flange.

10. The tank wall connector system according to claim 1, comprising two of said fasteners threadingly engaged to the threading on the body.

11. The tank wall connector system according to claim 1, further comprising a grounding strip contacting the connector at the exterior of the tank wall and adapted to be connected to a ground.

12. The tank wall connector system according to claim 11, wherein the grounding strip is adapted to be pressed against the tank wall by the at least one fastener.

13. An aircraft comprising:
a composite tank having at least one composite tank wall with at least one hole in the composite tank wall; and
a tank wall connector system according to claim 1, the tank wall connector system mounted to the tank wall at the at least one hole.

14. A tank wall connector system for use with a composite tank wall, comprising:

a connector having a body with an exterior end, an interior end and an abutment between the exterior end and the interior end, with at least the exterior end being adapted to be connected to an electrical wire;

an interface comprising at least an interface tube portion having an inner diameter sized for the connector to pass therethrough such that the exterior end of the connector is accessible from an exterior of the tank and the interior end is inside the tank, an outer diameter sized to be adapted to be received in a hole of the composite tank wall, and a radial wall projecting radially from the interface tube portion and adapted to abut against an interior surface of the tank wall adjacent to said hole, whereby electrical insulation is provided between the connector and the interior of the tank by the interface; and at least one fastener operatively engaged to the connector outside of the tank to pull the connector toward the exterior of the tank such that the abutment contacts the interface, whereby the interface is captive between the connector and the tank wall, wherein the body of the connector has threading thereon and the at least one fastener is threadingly engaged to the threading on the body.

15. The tank wall connector system according to claim 14, wherein the body of the connector is metallic.

16. The tank wall connector system according to claim 14, wherein the interface is made of composite material.

17. The tank wall connector system according to claim 14, comprising an anti-rotation feature adapted to be engaged to the tank wall.

18. The tank wall connector system according to claim 14, further comprising an outer tube portion projecting axially from the radial wall, the outer tube portion and the radial wall concurrently forming a receptacle for the interior end of the connector.

19. The tank wall connector system according to claim 14, wherein the interface is a monolithic piece.

20. An aircraft comprising:
a composite tank having at least one composite tank wall with at least one hole in the composite tank wall; and
a tank wall connector system according to claim 14, the tank wall connector system mounted to the tank wall at the at least one hole.

21. A method for connecting a connector system to a tank wall of a composite tank comprising:
positioning an interface through a hole in the tank wall;
positioning a connector in a tube portion of the interface to cause an abutment in an axial direction between the connector and the interface at which electrical insulation is provided between the connector and the interior of the tank by the interface when the interface and the connector are mounted to the tank wall;
engaging at least one fastener to an exterior end of the connector to pull the connector and the interface against the tank wall to a captive position; and
connecting a wire to at least one end of the connector,
wherein a body of the connector has threading thereon and the engaging comprises threadedly engaging the at least one fastener to the threading on the body.

* * * * *